US012779490B2

(12) United States Patent
Ouyang et al.

(10) Patent No.: US 12,779,490 B2
(45) Date of Patent: Nov. 3, 2026

(54) MICROPOROUS VAPORIZATION ASSEMBLY AND ELECTRONIC VAPORIZATION DEVICE

(71) Applicant: Shenzhen Moore Vaporization Health & Medical Technology Co., Ltd., Shenzhen (CN)

(72) Inventors: Guanglin Ouyang, Shenzhen (CN); Yongxiong Zhu, Shenzhen (CN); Ming Tang, Shenzhen (CN); Lei Li, Shenzhen (CN)

(73) Assignee: Shenzhen Moore Vaporization Health & Medical Technology Co., Ltd., Shenzhen (CN)

( * ) Notice: Subject to any disclaimer, the term of this patent is extended or adjusted under 35 U.S.C. 154(b) by 670 days.

(21) Appl. No.: 18/078,352

(22) Filed: Dec. 9, 2022

(65) Prior Publication Data

US 2023/0191440 A1 Jun. 22, 2023

(30) Foreign Application Priority Data

Dec. 17, 2021 (CN) ........................ 202111551849.4

(51) Int. Cl.
*B05B 17/00* (2006.01)
*B05B 17/06* (2006.01)

(52) U.S. Cl.
CPC ...... *B05B 17/0646* (2013.01); *B05B 17/0653* (2013.01)

(58) Field of Classification Search
CPC ........................ B05B 17/0646; B05B 17/0653
See application file for complete search history.

(56) References Cited

U.S. PATENT DOCUMENTS 6,427,682 B1 * 8/2002 Klimowicz ......... A61M 15/025 128/200.14
2002/0162898 A1 11/2002 Klimowicz et al.
2004/0050947 A1 3/2004 Power et al.
(Continued)

FOREIGN PATENT DOCUMENTS

CN 201371109 Y 12/2009
CN 205728052 U 11/2016
(Continued)

OTHER PUBLICATIONS

Japanese Patent Office, Notice of Reasons for Refusal in Japanese Patent Application No. 2022-189971 (Dec. 5, 2023).
(Continued)

*Primary Examiner* — Christopher R Dandridge
(74) *Attorney, Agent, or Firm* — Leydig, Voit & Mayer, Ltd.

(57) ABSTRACT

A microporous vaporization assembly includes: a piezoceramic plate, a through hole being provided in the piezoceramic plate; and a vaporization plate including a body part and a fence part, the body part being stacked on and bonded to the piezoceramic plate and covering the through hole, a plurality of vaporization holes being provided in an area of the body part corresponding to the through hole. The fence part is arranged protruding from a surface of the body part stacked with the piezoceramic plate and surrounds an outer circumference of the piezoceramic plate.

9 Claims, 4 Drawing Sheets

(56) References Cited

U.S. PATENT DOCUMENTS

| | | | | |
|---|---|---|---|---|
| 2012/0091224 | A1* | 4/2012 | Yu | B05B 17/0646 239/102.2 |
| 2019/0216135 | A1 | 7/2019 | Guo et al. | |
| 2021/0260312 | A1 | 8/2021 | Lacour-Gayet et al. | |

FOREIGN PATENT DOCUMENTS

| | | | |
|---|---|---|---|
| CN | 205728077 | U | 11/2016 |
| CN | 206414621 | U | 8/2017 |
| CN | 209697311 | U | 11/2019 |
| CN | 113262923 | A | 8/2021 |
| EP | 3251531 | A1 | 12/2017 |
| TW | 201215453 | A | 4/2012 |

OTHER PUBLICATIONS

European Patent Office, Search Report in European Patent Application No. 22213669.9 (May 10, 2023).

Chinese Patent Office, Office Action in Chinese Patent Application No. 202111551849.4 (Nov. 28, 2025).

* cited by examiner

MICROPOROUS VAPORIZATION ASSEMBLY AND ELECTRONIC VAPORIZATION DEVICE

CROSS-REFERENCE TO PRIOR APPLICATION

Priority is claimed to Chinese Patent Application No. 202111551849.4, filed on Dec. 17, 2021, the entire disclosure of which is hereby incorporated by reference herein.

FIELD

The present invention relates to the field of vaporization technologies, and in particular, to a microporous vaporization assembly and an electronic vaporization device.

BACKGROUND

An aerosol is a colloidal dispersion system formed by solid or liquid particles dispersing and suspending in a gaseous medium. An aerosol can be absorbed by human body through the respiratory system to provide users with a new alternative method of absorption. For example, a vaporization device can produce an aerosol by baking and heating an herbal or pasty aerosol-forming substrate. The vaporization device is applied in different fields to deliver an inhalable aerosol to users, replacing a conventional product form and a conventional absorption mode.

Generally, the vaporization device vaporizes the aerosol-forming substrate into an aerosol, and common vaporization methods are heating vaporization and ultrasonic vaporization. The principle of the ultrasonic vaporization is to use the high frequency vibration of a piezoceramic to drive a microporous ultrasonic vaporization plate to resonate. Vaporization holes in the microporous ultrasonic vaporization plate continuously and repeatedly deform or vibrate along with the vibration, and a solution is extruded and broken into fine droplets to form vaporized steam. In a microporous ultrasonic vaporization device, a vaporization plate is bonded to the piezoceramic plate. In a process of vaporization, the vaporization plate vibrates at a high frequency, and a liquid (which is not limited to a strong acid, a strong base, and a strong oxidant liquid) enters an adhesive layer between the vaporization plate and the piezoceramic plate due to vaporization vibration, corroding the adhesive layer and causing adhesive failure, which tends to lead to vibration failure to affect product performance and use effect.

SUMMARY

In an embodiment, the present invention provides a microporous vaporization assembly, comprising: a piezoceramic plate, a through hole being provided in the piezoceramic plate; and a vaporization plate comprising a body part and a fence part, the body part being stacked on and bonded to the piezoceramic plate and covering the through hole, a plurality of vaporization holes being provided in an area of the body part corresponding to the through hole, wherein the fence part is arranged protruding from a surface of the body part stacked with the piezoceramic plate and surrounds an outer circumference of the piezoceramic plate.

BRIEF DESCRIPTION OF THE DRAWINGS

Subject matter of the present disclosure will be described in even greater detail below based on the exemplary figures.

All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
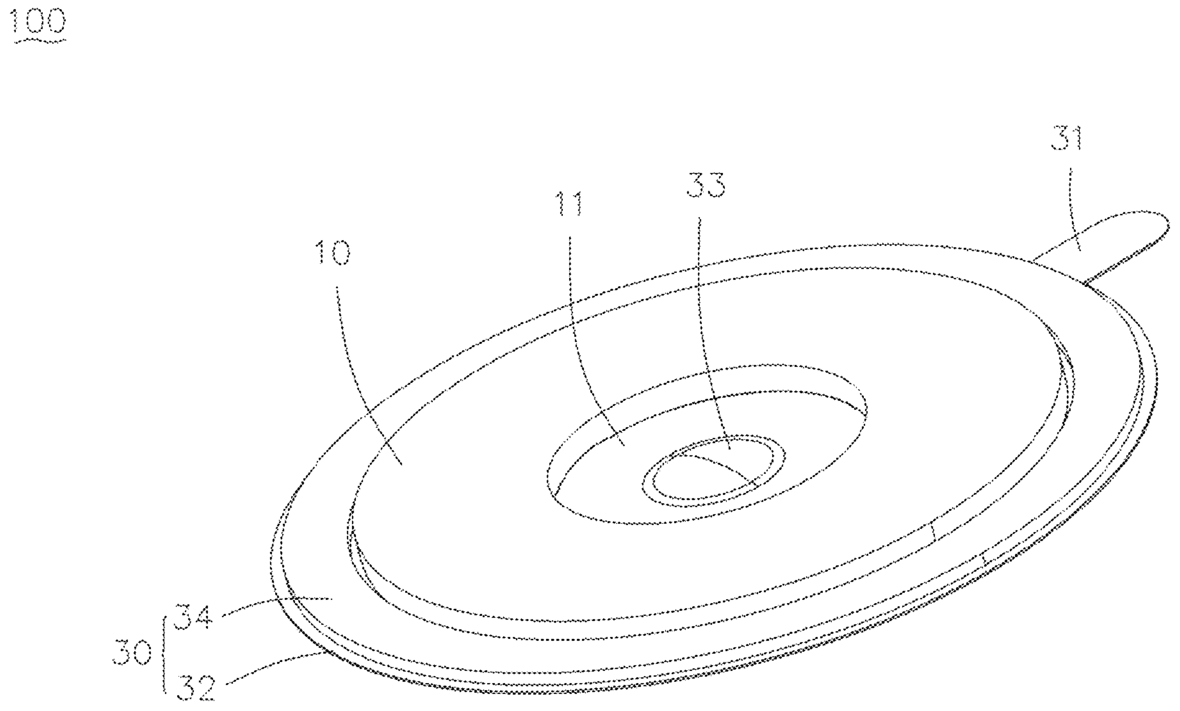
FIG. 1 is a schematic structural diagram of a microporous vaporization assembly according to an embodiment of the present invention.

In an embodiment, the present invention provides a microporous vaporization assembly and an electronic vaporization device to solve the problem that a microporous ultrasonic vaporization device is prone to vibration failure.

A microporous vaporization assembly is provided, the microporous vaporization assembly including:

- a piezoceramic plate, a through hole being provided in the piezoceramic plate; and
- a vaporization plate, the vaporization plate including a body part and a fence part, the body part being stacked on and bonded to the piezoceramic plate and covering the through hole, a plurality of vaporization holes being provided in an area of the body part corresponding to the through hole, where
- the fence part is arranged protruding from a surface of the body part stacked with the piezoceramic plate and surrounds an outer circumference of the piezoceramic plate.

In the foregoing microporous vaporization assembly, the vaporization plate is provided with the fence part. The fence part is arranged protruding from the surface of the body part facing the piezoceramic plate and surrounds the outer circumference of the piezoceramic plate. It is equivalent to that the fence part covers a gap between the piezoceramic plate and the body part, to prevent a liquid from permeating between the piezoceramic plate and the body part from an edge of the piezoceramic plate and corroding an adhesive during vaporization, thereby ensuring the effective bonding between the piezoceramic plate and the vaporization plate and further ensuring that the vaporization plate can effectively vibrate. In addition, the fence part is arranged protruding from the vaporization plate to improve the rigidity of the vaporization plate, so that the vaporization plate can be firmly bonded to the piezoceramic plate, to prevent the vaporization plate from bending due to low rigidity and being separated from the piezoceramic plate after repeated vibration, so that the bonding stability of the vaporization plate and the piezoceramic plate can be further improved.

In addition, the fence part is arranged surrounding the outer circumference of the piezoceramic plate, so that an adhesive bonded between the piezoceramic plate and the vaporization plate can be prevented from overflowing from an edge of the vaporization plate during compression, heating, and curing, thereby preventing the adhesive from overflowing and affecting a bonding process. In addition, the fence part is arranged on an outer circumference of the vaporization plate, so that the vibration of the vaporization plate can be better restricted in the central area. The central area of the vaporization plate is the area corresponding to the through hole of the piezoceramic plate. The plurality of vaporization holes are provided in the central area of the vaporization plate for vaporizing an aerosol-forming substrate. In this way, it is equivalent to that the vibration amplitude of a vaporization area on the vaporization plate is increased, thereby improving the vaporization effect. Therefore, the microporous vaporization assembly can prevent adhesive failure and adhesive overflow as well as improve the vaporization effect.

In an embodiment, the fence part is integrated with the body part, to avoid a gap between the fence part and the body part that allows a liquid to enter a side of the piezoceramic plate, thereby further improving a liquid blocking effect of the fence part.

In an embodiment, the fence part is constructed as an annular protrusion, and the annular protrusion is sleeved on the outer circumference of the piezoceramic plate at an interval, to reserve a particular gap in the outer circumference of the piezoceramic plate to allow the piezoceramic plate to vibrate in a radial direction thereof after being energized, thereby further driving the vaporization holes in the vaporization plate to deform in the axial direction and squeeze and vaporize the aerosol-forming substrate.

In an embodiment, in a radial direction of the annular protrusion, a gap between the annular protrusion and the piezoceramic plate ranges from 0.01 mm to 1.0 mm.

In an embodiment, a protrusion height of the fence part relative to the body part is less than or equal to a thickness of the piezoceramic plate.

In an embodiment, a ratio of the thickness of the piezoceramic plate to the protrusion height of the fence part relative to the body part ranges from 1:1 to 6:1.

In an embodiment, the protrusion height of the fence part relative to the body part ranges from 0.01 mm to 1.0 mm; and/or the thickness of the piezoceramic plate ranges from 0.5 mm to 1.0 mm.

In an embodiment, an outer diameter of the piezoceramic plate ranges from 5 mm to 20 mm; and/or, the thickness of the body part ranges from 0.01 mm to 1 mm.

In an embodiment, the microporous vaporization assembly further includes a bonding layer, the bonding layer is bonded between the body part and the piezoceramic plate.

An electronic vaporization device includes the foregoing microporous vaporization assembly.

Reference numerals: 100. microporous vaporization assembly; 10. piezoceramic plate; 11. through hole 30. vaporization plate; 31. tab; 32. body part; 33. convex; 34. fence part; and 50. bonding layer.

To make the foregoing objects, features and advantages of the present invention more comprehensible, detailed description is made to specific implementations of the present invention below with reference to the accompanying drawings. Many details are elaborated in the following description in order to fully understand the present invention. However, the present invention can be implemented in many other ways different from those described, and similar improvements can be made by technicians in the field without violating the connotation of the present invention, so the present invention is not limited by specific embodiments disclosed below.

In the description of the present invention, it should be understood that, orientation or position relationships indicated by terms such as "center", "longitudinal", "transverse", "length", "width", "thickness", "upper", "lower", "front", "rear", "left", "right", "vertical", "horizontal", "top", "bottom", "inner", "outer", "clockwise", "counter-clockwise", "axial", "radial", and "circumferential" are orientation or position relationship shown based on the accompanying drawings, and are merely used for describing the present invention and simplifying the description, rather than indicating or implying that the mentioned device or element should have a particular orientation or be constructed and operated in a particular orientation, and therefore, should not be construed as a limitation to the present invention.

In addition, the terms "first" and "second" are used for descriptive purposes only and are not to be construed as indicating or implying relative importance or implicitly indicating the number of technical features indicated. Therefore, a feature restricted by "first" or "second" may explicitly indicate or implicitly include at least one of such features. In the description of the present invention, unless otherwise explicitly defined, "a plurality of" means at least two, for example, two, three, and the like. In the present invention, unless otherwise explicitly specified and defined, terms such as "mounted", "connected", "connection", and "fixed" should be understood in a broad sense. For example, the connection may be a fixed connection, a detachable connection, or an integral connection; the connection can be mechanical or electrical or the connection may be a direct connection, an indirect connection through an intermediate medium, or internal communication between two elements or mutual action relationship between two elements, unless otherwise explicitly specified. A person of ordinary skill in the art may understand the specific meanings of the foregoing terms in the present invention according to specific situations.

In the present invention, unless otherwise explicitly specified and defined, a first feature is "on" or "below" a second feature may mean that the first feature and the second feature are in direct, or the first feature and the second feature are in indirect contact through an intermediate medium. In addition, that the first feature is "above", "over", or "on" the second feature may indicate that the first feature is directly above or obliquely above the second feature, or may merely indicate that the horizontal position of the first feature is higher than that of the second feature. That the first feature is "below", "under", and "beneath" the second feature may be that the first feature is directly below or obliquely below the second feature, or may merely indicate that the horizontal position of the first feature is lower than that of the second feature.

It should be noted that, when an element is referred to as "being fixed to" or "being arranged on" another element, the element may be directly on the another element, or an intermediate element may be present. When an element is considered to be "connected to" another element, the element may be directly connected to the another element, or an intermediate element may also be present. The terms "vertical", "horizontal", "upper", "lower", "left", "right", and similar expressions used in this specification are only for purposes of illustration but not indicate a unique implementation.

Referring to FIG. 1, an embodiment of the present invention provides a microporous vaporization assembly 100, used for vaporizing an aerosol-forming substrate. The microporous vaporization assembly 100 includes a piezoceramic plate 10 and a vaporization plate 30. The vaporization plate 30 and the piezoceramic plate 10 are stacked. A plurality of vaporization holes are provided in the vaporization plate 30. When the piezoceramic plate 10 is energized, it vibrates and drives the vaporization plate 30 to vibrate. The vaporization holes continuously and repeatedly deform or vibrate along with the vibration of the vaporization plate 30, and a liquid aerosol-forming substrate is extruded and broken into fine droplets to form a vaporized aerosol. Generally, the vaporization holes are micropores. In some implementations, an aperture of the vaporization hole may range from 1 μm to 20 μm. Preferably, the aperture of the vaporization hole may range from 3 μm to 15 μm.

Further, a through hole 11 is provided in the piezoceramic plate 10. The vaporization plate 30 includes a body part 32. The body part 32 is stacked on and bonded to the piezoceramic plate 10 and covers the through hole 11. A plurality of vaporization holes are provided in an area of the body part 32 corresponding to the through hole 11, communicating the vaporization holes and the through hole 11. When the vaporization plate 30 vibrates, vaporized droplets formed after an aerosol-forming substrate is extruded and vaporized by the vaporization holes in the body part 32 may flow out through the through hole 11 in the piezoceramic plate 10.

In some embodiments, the body part 32 and the piezoceramic plate 10 are bonded by a conductive adhesive. The microporous vaporization assembly 100 further includes a positive lead and a negative lead. One of the positive lead and the negative lead is connected to the body part 32, and the other of the positive lead and the negative lead is connected to the piezoceramic plate 10. In this way, the piezoceramic plate 10 of the microporous vaporization assembly 100 is connected to a circuit by the positive lead and the negative lead, so that the piezoceramic plate 10 is energized and vibrates. In addition, the positive lead and the negative lead are connected by welding. Optionally, the body part 32 is arranged protruding from a tab 31 in a radial direction, and the positive lead or the negative lead are welded to the tab 31.

Further, generally, a side of the piezoceramic plate 10 away from the vaporization plate 30 is covered with an electrode layer. The electrode layer is a conductive metal layer, for example, an alloy containing silver. The electrode layer may be connected to the positive lead or the negative lead, to be further connected to an external power supply to conduct electricity, thereby implementing electrical communication of the piezoceramic plate 10.

Specifically, the area of the vaporization plate 30 provided with the plurality of vaporization holes is constructed protruding in a direction of extending into the through hole 11. It is equivalent to that a central area of the vaporization plate 30 forms a convex 33 by bending towards the through hole 11. The plurality of vaporization holes are provided in the convex 33. In this way, when driven by the piezoceramic plate 10 to vibrate, the vaporization plate 30 may guide the aerosol-forming substrate to flow in a direction of passing through the through hole 11. A protruding direction of the convex 33 is a flowing direction of the substrate.

The vaporization plate 30 further includes the fence part 34. The fence part 34 is arranged protruding from the surface of the body part 32 stacked with the piezoceramic plate 10 and surrounds an outer circumference of the piezoceramic plate 10. It is equivalent to that the fence part 34 covers a gap between the piezoceramic plate 10 and the body part 32, to prevent a liquid from permeating between the piezoceramic plate 10 and the body part 32 from an edge of the piezoceramic plate 10 and corroding an adhesive during vaporization, thereby ensuring the effective bonding between the piezoceramic plate 10 and the vaporization plate 30 and further ensuring that the vaporization plate 30 can effectively vibrate. In addition, the fence part 34 is arranged protruding from the vaporization plate 30 to improve the rigidity of the vaporization plate 30, so that the vaporization plate 30 can be firmly bonded to the piezoceramic plate 10, to prevent the vaporization plate 30 from bending due to low rigidity and being separated from the piezoceramic plate 10 after repeated vibration, so that the bonding stability of the vaporization plate 30 and the piezoceramic plate 10 can be further improved.

In addition, the fence part 34 is arranged surrounding the outer circumference of the piezoceramic plate 10, so that an adhesive bonded between the piezoceramic plate 10 and the vaporization plate 30 can be prevented from overflowing from an edge of the vaporization plate 30 during compression, heating, and curing, thereby preventing the adhesive from overflowing and affecting a bonding process. In addition, the fence part 34 is arranged on an outer circumference of the vaporization plate 30, so that the vibration of the vaporization plate 30 can be better restricted in the central area. The central area of the vaporization plate 30 is the area corresponding to the through hole 11 of the piezoceramic plate 10. The plurality of vaporization holes are provided in the central area of the vaporization plate 30 for vaporizing an aerosol-forming substrate. In this way, it is equivalent to that the vibration amplitude of a vaporization area on the vaporization plate 30 is increased, thereby improving the vaporization effect. Therefore, the microporous vaporization assembly 100 can prevent adhesive failure and adhesive overflow as well as improve the vaporization effect.

In some embodiments, the body part 32 is integrated with the fence part 34, to avoid a gap between the fence part 34 and the body part 32 that allows a liquid to enter a side of the piezoceramic plate 10, thereby further improving a liquid blocking effect of the fence part 34. Optionally, the vaporization plate 30 is made of any one of stainless steel, a titanium alloy, and a palladium nickel alloy. Optionally, blind holes are opened in raw materials through machining, electroforming or etching, to manufacture the body part 32 and the fence part 34 that are integrated.

Figure 2:
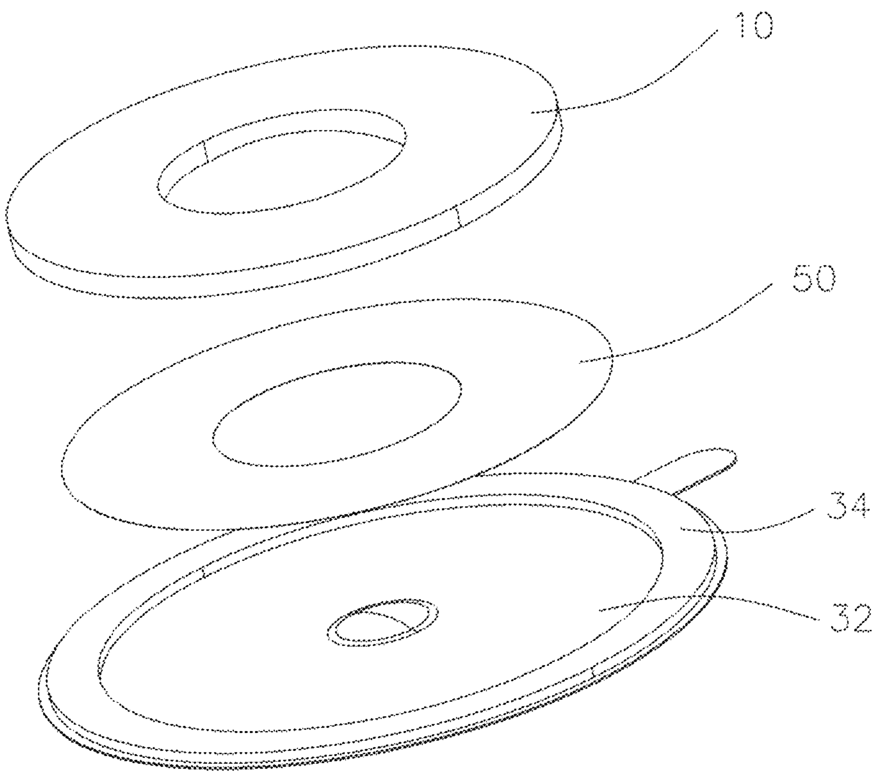
FIG. 2 is a schematic exploded view of the microporous vaporization assembly shown in FIG. 1.
Figure 3:
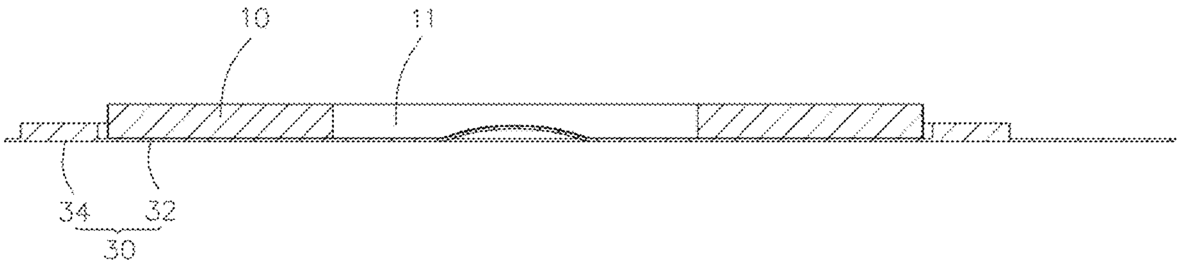
FIG. 3 is a schematic cross-sectional view of the microporous vaporization assembly shown in FIG. 1.

Referring to FIG. 1 to FIG. 3, in some embodiments, the microporous vaporization assembly 100 further includes a bonding layer 50. The bonding layer 50 is bonded between the body part 32 and the piezoceramic plate 10 to bond the vaporization plate 30 and the piezoceramic plate 10. Optionally, the bonding layer 50 is made of epoxy glue or a solid adhesive film. Specifically, in a bonding process, the bonding layer 50 is bonded to a surface of the piezoceramic plate 10 through screen printing (including, but not limited to, dispensing and coating), then the piezoceramic plate 10 with the bonding layer is placed in the fence part 34 of the vaporization plate 30, and the bonding layer 50 on the piezoceramic plate 10 is put in contact with the body part 32. Finally, the piezoceramic plate 10 and the vaporization plate 30 are laminated and cured at a high temperature. A curing temperature and a curing duration are determined according to characteristics of the bonding layer 50. The piezoceramic plate 10 and the vaporization plate 30 that are stacked and bonded is eventually obtained, thereby producing the microporous vaporization assembly 100.

In addition, the fence part 34 is arranged surrounding the outer circumference of the piezoceramic plate 10, so that an adhesive bonded between the piezoceramic plate 10 and the vaporization plate 30 can be prevented from overflowing from an edge of the vaporization plate 30 during compression, heating, and curing, thereby preventing bonding between the adhesive and an external fixture and avoiding affecting the normal use of the fixture, so that the microporous vaporization assembly 100 can prevent adhesive failure and adhesive overflow.

Figure 5:
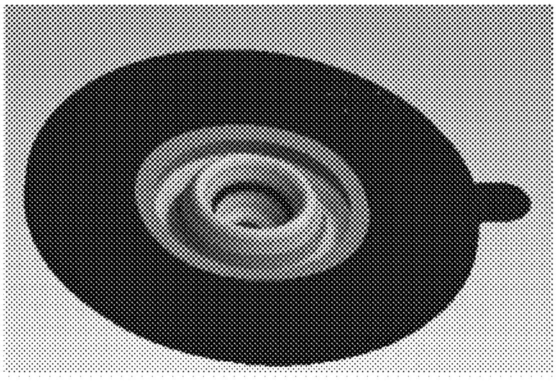
FIG. 5 is a diagram of vibration modal simulation of an existing microporous vaporization assembly in the related art.
Figure 6:
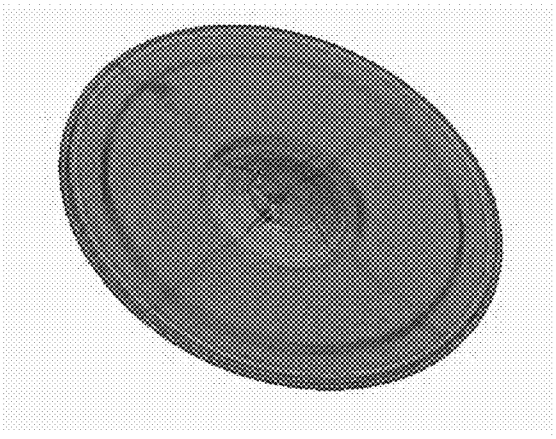
FIG. 6 is a diagram of vibration modal simulation of the microporous vaporization assembly shown in FIG. 1.

In some embodiments, the fence part 34 is constructed as an annular protrusion, the annular protrusion matches the shape of the outer circumference of the piezoceramic plate 10 to block and protect the piezoceramic plate 10 in all directions of the outer circumference of to prevent the piezoceramic plate 10 from adhesive failure and adhesive overflow in a bonding process. In addition, the vibration of the vaporization plate 30 is concentrated to the central area through the annular protrusion, thereby improving the vaporization effect. Specifically, FIG. 5 is a diagram of vibration modal simulation of an existing microporous vaporization assembly in the related art. FIG. 6 is a diagram of vibration modal simulation of the microporous vaporization assembly 100. It can be seen from FIG. 6 that the vibration of the microporous vaporization assembly 100 provided in this application is concentrated in the central area of the vaporization plate 30.

Figure 4:
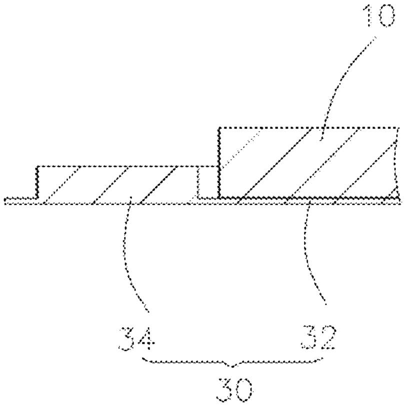
FIG. 4 is a schematic partial enlarged view of the microporous vaporization assembly shown in FIG. 3.

Referring to FIG. 1, FIG. 3, and FIG. 4, further, the annular protrusion is sleeved on the outer circumference of the piezoceramic plate 10 at an interval, to reserve a particular gap in the outer circumference of the piezoceramic plate 10 to allow the piezoceramic plate 10 to vibrate in a radial direction thereof after being energized, thereby further driving the vaporization holes in the vaporization plate 30 to deform in the axial direction and squeeze and vaporize the aerosol-forming substrate.

Optionally, in a radial direction of the annular protrusion, a gap between the annular protrusion and the piezoceramic plate 10 ranges from 0.01 mm to 1.0 mm, allowing the piezoceramic plate 10 to vibrate in the radial direction thereof.

In some embodiments, a protrusion height of the fence part 34 relative to the body part 32 is less than or equal to the thickness of the piezoceramic plate 10. That is, the fence part 34 is not higher than the piezoceramic plate 10. In this way, the vibration of the vaporization plate 30 is prevented from being hindered by the excessive thickness and weight of the fence part 34, thereby maintaining better vibration and vaporization performance of the vaporization plate 30.

Further, a ratio of the thickness of the piezoceramic plate 10 to the protrusion height of the fence part 34 relative to the body part 32 ranges from 1:1 to 6:1. That is, when the protrusion height of the fence part 34 is the lowest, the thickness of the piezoceramic plate 10 is six times the protrusion height of the fence part 34. When the protrusion height of the fence part 34 is the highest, the thickness of the piezoceramic plate 10 is equal to the protrusion height of the fence part 34. In this case, it is set that the protrusion height of the fence part 34 relative to the body part is less than or equal to the thickness of the piezoceramic plate 10.

Optionally, the protrusion height of the fence part 34 relative to the body part 32 ranges from 0.01 mm to 1.0 mm, the thickness of the piezoceramic plate ranges from 0.5 mm to 1.0 mm. According to the thickness of the piezoceramic plate 10, the protrusion height of the fence part 34 relative to the body part 32 is appropriately set, to prevent a liquid from flowing into a gap on a side of the piezoceramic plate 10 through the fence part 34 and corroding an adhesive and prevent an adhesive from overflowing from the outer circumference of the vaporization plate 30 and causing inconvenience to an assembly process. In addition, the vibration amplitude in the central area of the vaporization plate 30 can be improved by arranging a fence part with an appropriate thickness, so that the vaporization effect of the vaporization plate 30 can be improved. Preferably, the protrusion height of the fence part 34 relative to the body part 32 ranges from 0.05 mm to 0.8 mm, and the thickness of the piezoceramic plate ranges from 0.6 to 0.8 mm, so that the microporous vaporization assembly 100 can better prevent adhesive failure and adhesive overflow and have better vibration vaporization performance.

Further, an outer diameter of the piezoceramic plate 10 ranges from 5 mm to 20 mm, and the thickness of the body part 32 ranges from 0.01 mm to 1 mm. Specifically, the protrusion height of the fence part 34 relative to the body part 32 ranges from 0.01 mm to 1.0 mm, and the thickness of the piezoceramic plate ranges from 0.5 mm to 1.0 mm. In addition, the outer diameter of the piezoceramic plate 10 ranges from 5 mm to 20 mm, and the thickness of the body part 32 ranges from 0.01 mm to 1 mm. The size of each component of the microporous vaporization assembly 100 is kept in an appropriate range, thereby ensuring that the microporous vaporization assembly 100 prevents adhesive failure and adhesive overflow and has vibration vaporization performance on the whole. The foregoing microporous vaporization assembly 100 includes a piezoceramic plate 10 and a vaporization plate 30. The vaporization plate 30 is stacked on and bonded to the piezoceramic plate. A fence part 34 surrounding an outer circumference of the piezoceramic plate 10 is arranged on the vaporization plate 30 to prevent a liquid from entering a gap between the vaporization plate 30 and the piezoceramic plate 10 and corroding an adhesive. In addition, the fence part 34 prevents adhesive overflow in a process of assembling the piezoceramic plate 10 and the vaporization plate 30. In addition, the fence part 34 concentrates the vibration of the vaporization plate 30 to a central area provided with vaporization holes, thereby improving the vaporization effect.

Based on the same inventive concept, an embodiment of the present invention further provides an electronic vaporization device including the foregoing microporous vaporization assembly 100. The microporous vaporization assembly 100 further includes a piezoceramic plate 10 and a vaporization plate 30. The vaporization plate 30 and the piezoceramic plate 10 are stacked. Vaporization holes are provided in the vaporization plate 30. When energized, the piezoceramic plate 10 vibrates and drives the vaporization plate 30 to vibrate. The vaporization holes continuously and repeatedly deform with the vibration when the vaporization plate 30 vibrates, and a liquid aerosol-forming substrate is extruded and broken into fine droplets to form a vaporized aerosol.

Further, a through hole 11 is provided in the piezoceramic plate 10. The vaporization plate 30 includes a body part 32. The body part 32 is stacked on and bonded to the piezoceramic plate 10 and covers the through hole 11. A plurality of vaporization holes are provided in the area of the body part 32 corresponding to the through hole 11, communicating the vaporization holes and the through hole 11. When the vaporization plate 30 vibrates, vaporized droplets formed after an aerosol-forming substrate is extruded and vaporized by the vaporization holes in the body part 32 may flow out through the through hole 11 in the piezoceramic plate 10.

The vaporization plate 30 further includes the fence part 34. The fence part 34 is arranged protruding from the surface of the body part 32 stacked with the piezoceramic plate 10 and surrounds an outer circumference of the piezoceramic plate 10. It is equivalent to that the fence part 34 covers a gap between the piezoceramic plate 10 and the body part 32, to prevent a liquid from permeating between the piezoceramic plate 10 and the body part 32 from an edge of the piezoceramic plate 10 and corroding an adhesive during vaporization, thereby ensuring the effective bonding between the piezoceramic plate 10 and the vaporization plate 30 and further ensuring that the vaporization plate 30 can effectively vibrate. In addition, the fence part 34 is arranged protruding from the vaporization plate 30 to improve the rigidity of the vaporization plate 30, so that the vaporization plate 30 can be firmly bonded to the piezoceramic plate 10, to prevent the vaporization plate 30 from bending due to low rigidity and being separated from the piezoceramic plate 10 after repeated vibration, so that the bonding stability of the vaporization plate 30 and the piezoceramic plate 10 can be further improved.

In addition, the fence part 34 is arranged surrounding the outer circumference of the piezoceramic plate 10, so that an adhesive bonded between the piezoceramic plate 10 and the vaporization plate 30 can be prevented from overflowing from an edge of the vaporization plate 30 during compression, heating, and curing, thereby preventing the adhesive from overflowing and affecting a bonding process. In addition, the fence part 34 is arranged on an outer circumference of the vaporization plate 30, so that the vibration of the vaporization plate 30 can be better restricted in the central area. The central area of the vaporization plate 30 is the area corresponding to the through hole 11 of the piezoceramic plate 10. The plurality of vaporization holes are provided in the central area of the vaporization plate 30 for vaporizing an aerosol-forming substrate. In this way, it is equivalent to that the vibration amplitude of a vaporization area on the vaporization plate 30 is increased, thereby improving the vaporization effect. Therefore, the microporous vaporization assembly 100 can prevent adhesive failure and adhesive overflow as well as improve the vaporization effect.

In some embodiments, the body part 32 is integrated with the fence part 34, to avoid a gap between the fence part 34 and the body part 32 that allows a liquid to enter a side of the piezoceramic plate 10, thereby further improving a liquid blocking effect of the fence part 34. Optionally, the vaporization plate 30 is made of any one of stainless steel, a titanium alloy, and a palladium nickel alloy. Optionally, blind holes are opened in raw materials through machining, electroforming or etching, to manufacture the body part 32 and the fence part 34 that are integrated.

The foregoing microporous vaporization assembly 100 includes a piezoceramic plate 10 and a vaporization plate 30. The vaporization plate 30 is stacked on and bonded to the piezoceramic plate. A fence part 34 surrounding an outer circumference of the piezoceramic plate 10 is arranged on the vaporization plate 30 to prevent a liquid from entering a gap between the vaporization plate 30 and the piezoceramic plate 10 and corroding an adhesive. In addition, the fence part 34 prevents adhesive overflow in a process of assembling the piezoceramic plate 10 and the vaporization plate 30. In addition, the fence part 34 concentrates the vibration of the vaporization plate 30 to a central area provided with vaporization holes, thereby improving the vaporization effect.

The technical features in the foregoing embodiments may be randomly combined. For concise description, not all possible combinations of the technical features in the embodiments are described. However, provided that combinations of the technical features do not conflict with each other, the combinations of the technical features are considered as falling within the scope described in this specification.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A microporous vaporization assembly, comprising:

a piezoceramic plate, a through hole being provided in the piezoceramic plate; and a vaporization plate comprising a body part and a fence part, the body part being stacked on and bonded to the piezoceramic plate and covering the through hole, a plurality of vaporization holes being provided in an area of the body part corresponding to the through hole, wherein the fence part is arranged protruding from a surface of the body part stacked with the piezoceramic plate and surrounds an outer circumference of the piezoceramic plate, and wherein a protrusion height of the fence part relative to the body part is less than or equal to a thickness of the piezoceramic plate.

2. The microporous vaporization assembly of claim 1, wherein the fence part is integrated with the body part.

3. The microporous vaporization assembly of claim 1, wherein the fence part comprises an annular protrusion, and wherein the annular protrusion is sleeved on the outer circumference of the piezoceramic plate at an interval.

4. The microporous vaporization assembly of claim 3, wherein, in a radial direction of the annular protrusion, a gap between the annular protrusion and the piezoceramic plate ranges from 0.01 mm to 1.0 mm.

5. The microporous vaporization assembly of claim 1, wherein a ratio of the thickness of the piezoceramic plate to the protrusion height of the fence part relative to the body part ranges from 1:1 to 6:1.

6. The microporous vaporization assembly of claim 1, wherein the protrusion height of the fence part relative to the body part ranges from 0.01 mm to 1.0 mm, and/or wherein the thickness of the piezoceramic plate ranges from 0.5 mm to 1.0 mm.

7. The microporous vaporization assembly of claim 6, wherein an outer diameter of the piezoceramic plate ranges from 5 mm to 20 mm, and/or the thickness of the body part ranges from 0.01 mm to 1 mm.

8. The microporous vaporization assembly of claim 1, further comprising:

a bonding layer, wherein the bonding layer is bonded between the body part and the piezoceramic plate.

9. An electronic vaporization device, comprising:

the microporous vaporization assembly of claim 1.

* * * * *